United States Patent [19]
Miura

[11] Patent Number: 5,647,152
[45] Date of Patent: Jul. 15, 1997

[54] DISPLAYING APPARATUS WITH LIGHT-SHIELDING GRATING

[75] Inventor: Masanobu Miura, Osaka, Japan

[73] Assignee: Takiron Co., Ltd., Osaka, Japan

[21] Appl. No.: 405,896

[22] Filed: Mar. 17, 1995

[30] Foreign Application Priority Data

Mar. 18, 1994 [JP] Japan ................................. 6-074258
Apr. 21, 1994 [JP] Japan ................................. 6-107967

[51] Int. Cl.$^6$ ............................................ F21V 29/00
[52] U.S. Cl. ........................... 40/541; 362/290; 362/292; 362/354
[58] Field of Search ..................... 40/554, 551, 550, 40/564, 442, 427; 362/290, 292, 354, 812

[56] References Cited

U.S. PATENT DOCUMENTS

| | | | |
|---|---|---|---|
| 2,942,254 | 6/1960 | Beers | 362/354 X |
| 3,194,954 | 7/1965 | Locke | 362/290 |
| 3,728,808 | 4/1973 | Rieth | 362/290 X |
| 4,234,914 | 11/1980 | Boesen | 40/550 |
| 4,877,308 | 10/1989 | Okuno et al. | 362/354 X |

*Primary Examiner*—Kenneth J. Dorner
*Assistant Examiner*—Cassandra Davis
*Attorney, Agent, or Firm*—Sughrue, Mion, Zinn, Macpeak & Seas

[57] ABSTRACT

A displaying apparatus includes a display screen, and a light-shielding grating member having a plurality of light-shielding plates which are assembled in a matrix form in vertical and horizontal directions, the light-shielding grating member being disposed in front of the display screen. In the displaying apparatus, the respective light-shielding plates in the vertical and horizontal directions are inclined in directions to pass a predetermined visual point range when the respective light-shielding plates are virtually extended frontward, or the light-shielding grating member is inclined frontward and backward with respect to the display screen within a predetermined angle range. According to such a structure, external light obliquely injected into the display screen from the left, right, upper and lower sides can be shielded so as to improve a display contrast and visibility to prevent difficulties in seeing the image.

13 Claims, 10 Drawing Sheets

1

DISPLAYING APPARATUS WITH LIGHT-SHIELDING GRATING

BACKGROUND OF THE INVENTION

1. Field of the Invention

The present invention relates to a display in which a visual point (seeing distance and seeing position) with respect to a display screen is specified in a narrow range, such as displays for displaying the pitcher's pitching motion installed in baseball or softball batting practice centers (so-called "batting centers") and displays for displaying the individual player's motion installed in tennis practicing centers (so-called "auto-tennis").

2. Description of the Conventional Art

In a baseball batting center, many pitching machines are employed to throw balls toward the batters' boxes about 15 to 20 m ahead thereof, and individual batters practice batting the thrown balls back while standing in the batters' boxes. However, in actual batting, the batter swings his bat by counting the ball pitching timing while watching the pitcher's pitching motion. Therefore, this system employing the pitching machines has a problem in that the batter has difficulty attempting to find the ball pitching timing.

To overcome this problem, the conventional batting centers have introduced a display 12 such as shown in FIG. 22. This display 12 is located in front of a batter 11 to display the pitching motion of a pitcher, and a ball is thrown by a pitching machine 13 at the same timing as the pitcher in the image throws the ball, so that the batter 11 can practice batting as if he were batting under actual conditions.

However, the batting centers are generally located outdoors where it is light, or is illuminated so that the ball can be seen with ease even if located indoors. Accordingly, to give a clear pitching motion image to the batter 11 who is as many as 20 m away from the display in such a place, a display screen having such a high luminance as to resist surrounding lightness is necessary, which in turn has imposed a problem that an expensive display 12 has to be used. In addition, displays 12 of adjacent batter's boxes are seen from the batter 11 in front of him or her in juxtaposition, and the pitching motions of these displays have therefore made it hard for the batter 11 to concentrate only on the image of the display 12 for his batter's box, which is another problem.

This problem can be temporarily overcome by arranging in front of the display 12 a grating-like shielding member or the like for blocking injection of external light. However, if a grating-like shielding member is arranged, the batter 11 finds it easy to see the image just as long as the visual point of the batter 11 stays right in front of the display 12, but if the relative positional relationship between the visual point and the display 12 is shifted up, down, left, and right to a large degree due to installation conditions, a ratio at which the visibility of an image is disturbed by the light-shielding member (image disturbing ratio) is increased, thus imposing the problem that the batter finds it hard to see the image.

In this case, leftward and rightward displacements of the visual point can be corrected with ease by turning the display 12 horizontally so that the display screen faces directly in front of the batter's box. However, for the correction of upward and downward displacements of the visual point, it is necessary to (1) make the display 12 installation level substantially as high as the ground level of the batter's box; (2) to install the display 12 so as to be inclined; or (3) to insert an angle adjusting spacer into the lower end of the display 12; and the like. However, case (1) entails a large construction work and cost, and cases (2) and (3) require not only cumbersome and laborious work in making fine angle adjustments due to the display 12 being large-sized and heavy, but also make it likely that the display 12 will fall down due to the center of gravity of the display 12 being one-sided.

SUMMARY OF THE INVENTION

It is an object of the present invention to provide a displaying apparatus with a light-shielded grating which can shield external light obliquely injected at a display screen thereof so as to improved display contrast as well as visibility, and to prevent difficulties in seeing the image.

In order to accomplish the above object, a displaying apparatus of the present invention is comprised of a display screen for displaying images thereon; and a light-shielding grating member including a plurality of light-shielding plates which are assembled in a matrix form in vertical and horizontal directions, the light-shielding grating member being disposed in front of the display screen; wherein the respective light-shielding plates in the vertical and horizontal directions are inclined in directions to pass the predetermined visual point range when the respective light-shielding plates are virtually extended frontward.

Further, another displaying apparatus of the present invention is comprised of a display body having a display screen for displaying images thereon; a light-shielding grating member including a plurality of light-shielding plates which are assembled in a matrix form in vertical and horizontal directions, the light-shielding grating member being disposed in front of the display screen; and a housing having an opening in a front thereof, the light-shielding grating member being disposed in an inside of the housing; inclining device for inclining the light-shielding grating member frontward and backward with respect to the display screen within a predetermined angle range.

In accordance with the displaying apparatus of the present invention, when the light-shielding grating member with the light-shielding plates assembled in matrix form in vertical and horizontal directions are arranged in front of the display screen, external light obliquely injected into the display screen from the left, right, upper and lower sides can be shielded. Therefore, display contrast can be improved, which in turn improves visibility and prevents difficulties in seeing the image. Hence, even if the display is installed in a light environment such as outdoors in which direct sunlight is received, images can be displayed with good visibility using a low-luminance and inexpensive display.

Further, the light-shielding grating member is disposed with the housing in such a manner as to be inclined frontward and backward with respect to the display screen of the display body within the predetermined angle range. Therefore, even if the relative positional relationship between the visual point and the display screen is shifted up and down due to installation condition, the image disturbing ratio by the light-shielding grating can be minimized to maintain satisfactory visibility by inclining only the light-shielding grating member frontward and backward without inclining the display as a whole and only adjusting the light-shielding grating so as to be at right angles to the visual point.

PREFERRED EMBODIMENT OF THE INVENTION

The preferred embodiments of the present invention will be described referring to the accompanying drawings.

First Embodiment

Figure 1:
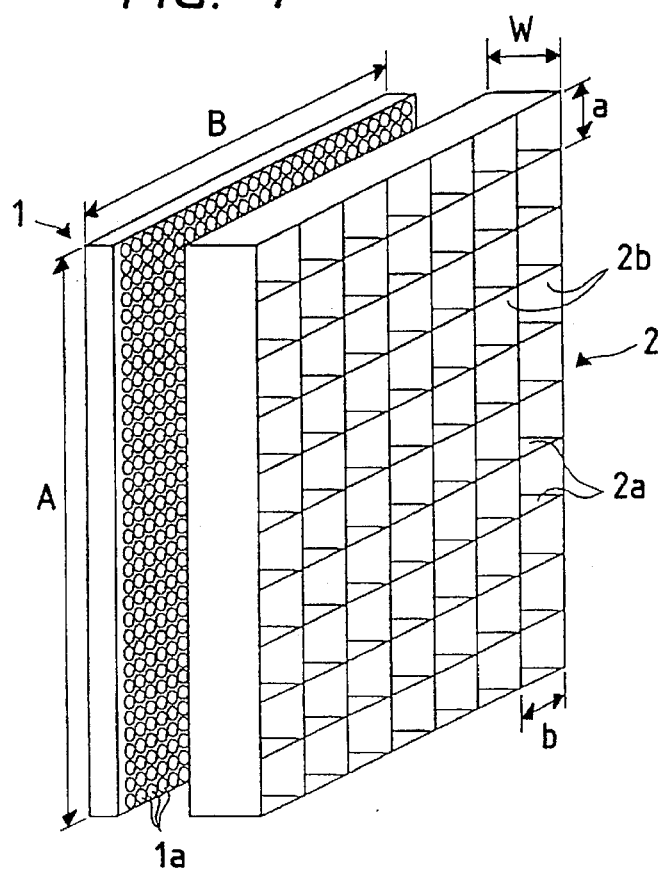
FIG. 1 is an exploded perspective view of a display with of a first embodiment of the present invention.
Figure 3:
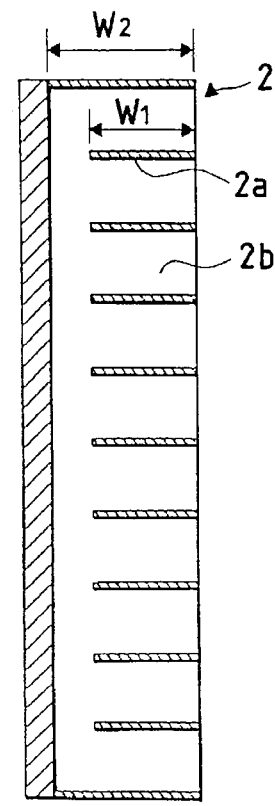
FIG. 3 is a general longitudinal sectional view of the display of the first embodiment.
Figure 2:
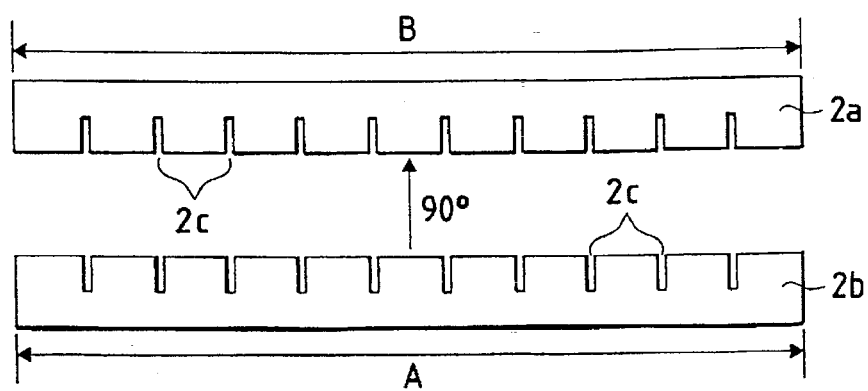
FIG. 2 is a side view showing light-shielding plates of the light-shielding grating a light-shielding grating of the first embodiment.
Figure 4:
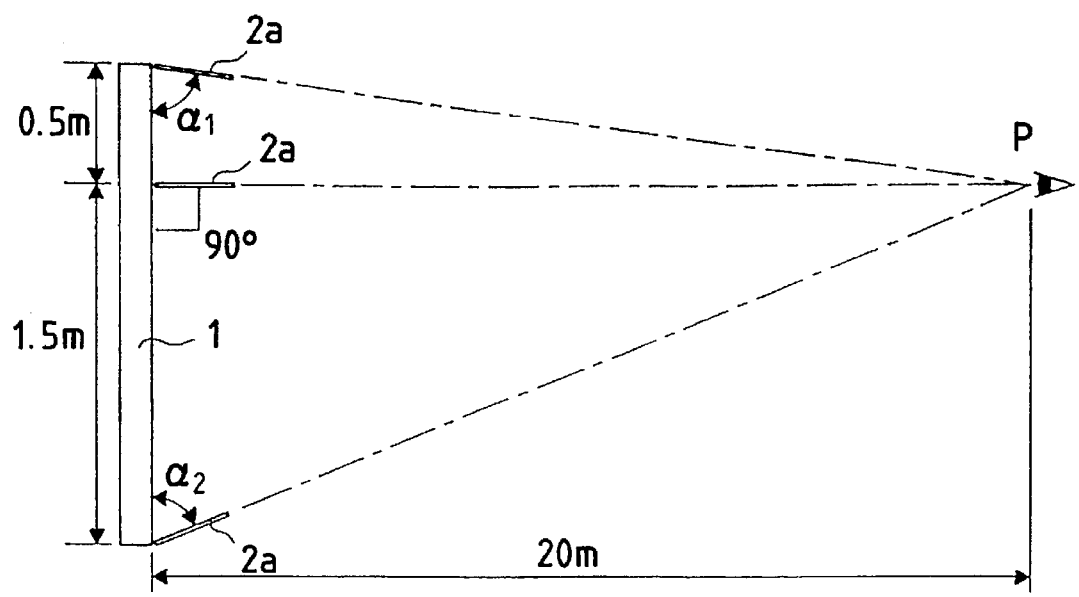
FIG. 4 is a side view illustrative of how the light-shielding plates of the light-shielding grating are inclined.
Figure 5:
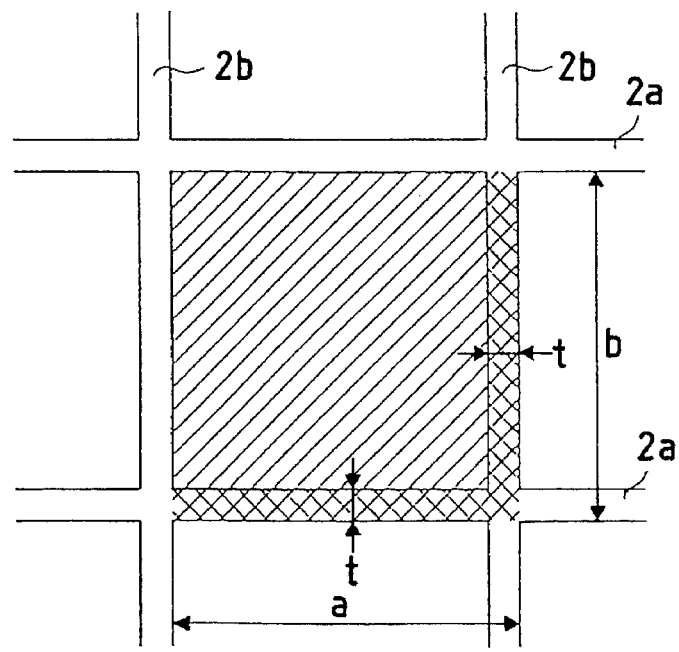
FIG. 5 is a partial front view showing a single mesh of the light-shielding grating of the first embodiment.
Figure 6:
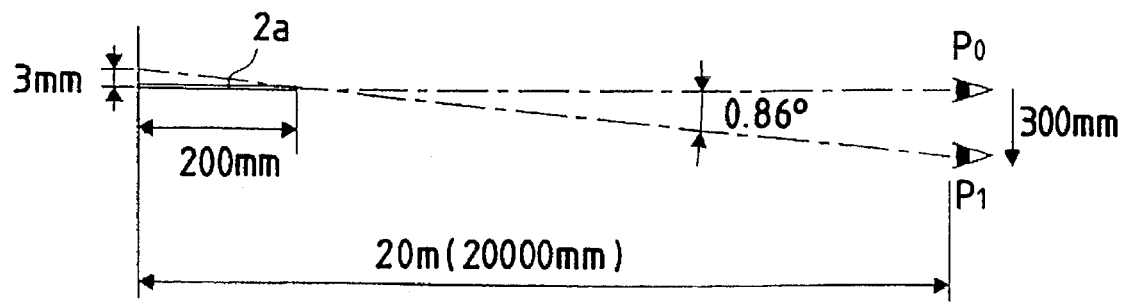
FIG. 6 is a side view illustrative of how shifting of a visual point with respect to a single light-shielding plate affects visibility.
Figure 7:
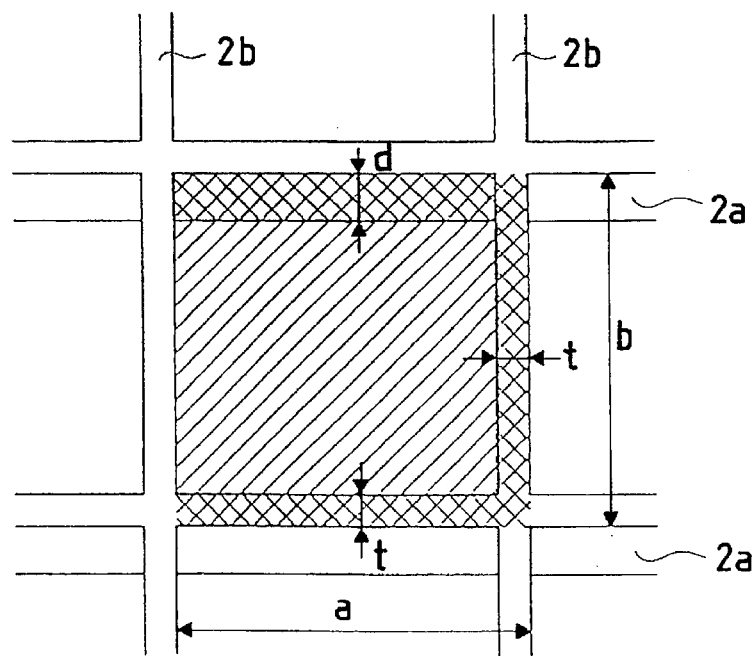
FIG. 7 is a partial front view illustrative of how shifting of a visual point with respect to a single mesh of the light-shielding grating affects visibility.
Figure 8:
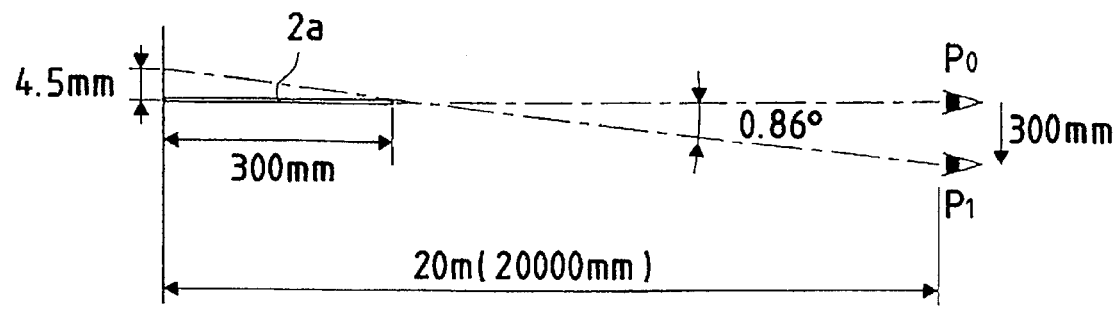
FIG. 8 is another side view illustrative of how shifting of a visual point with respect to a single light-shielding plate affects visibility.

FIGS. 1 to 8 show a first embodiment of the invention. FIG. 1 is an exploded perspective view of a display with a light-shielding grating of the first embodiment; FIG. 2 is a side view showing light-shielding plates of the light-shielding grating; FIG. 3 is a general longitudinal sectional view of the display; FIG. 4 is a side view illustrating as to an inclination of the light-shielding plates of the light-shielding grating; FIG. 5 is a partial front view showing a single mesh of the light-shielding grating; FIG. 6 is a side view illustrative of how shifting of a visual point with respect to a single light-shielding plate affects visibility; FIG. 7 is a partial front view illustrative of how shifting of a visual point with respect to a single mesh of the light-shielding grating affects visibility; and FIG. 8 is another side view illustrative of how shifting of a visual point with respect to a single light-shielding plate affects visibility.

This embodiment exemplifies a display with a light-shielding grating, installed in a batting center, for displaying a pitching motion by means of light emission.

As shown in FIG. 1, this display includes a display screen 1 and a light-shielding grating 2 disposed in front of the display screen 1.

The display screen 1 is constructed of an LED dot matrix light-emitting display body having a multiplicity of light-emitting dots (pixels) 1a arranged in matrix form in the front thereof. Through selective lighting control of each light-emitting dot 1a, the display screen 1 can display arbitrary images such as the pitching motion of a pitcher. To display a clear image in a light outdoor environment or the like using such a display screen 1, it is usually necessary to increase the number of LEDs within each light-emitting dot 1a or to use high-luminance LEDs so that the light-emitting luminance of each light-emitting dot 1a can be increased. In contrast thereto, this embodiment, instead of using such particularly high-luminance light-emitting dots 1a, utilizes effects of the light-shielding grating 2 to provide a sufficiently visible display image.

While the display screen 1 based on the LED dot matrix system that is optimal for the application is employed in this embodiment, the invention is not limited thereto. Light-emitting displays such as liquid crystal displays (LCD), plasma display panels (PDP), fluorescent character display tubes may also be used in the invention.

The light-shielding grating 2 is assembled by crossing a multiplicity of horizontally extending light-shielding plates 2a and vertically extending light-shielding plates 2b at an equal interval in matrix form. That is, as shown in, e.g., FIG. 2, equidistantly pitched slits 2c are provided on one side of each light-shielding plate 2a or 2b, and the light-shielding plates 2a and 2b are arranged in parallel crosses by meshing the slits 2c so as to be perpendicular to one another. This construction provides not only an advantage of easy machining and assembling of material, but also an advantage of sufficient rigidity by the arrangement of the material in parallel crosses even if the material is thin, and these advantages make the light-shielding grating optimal for the application. The light-shielding plates 2a, 2b are made of a resin plate, a metal plate, or the like. It is, however, preferable that a metal plate such as a steel plate that is as thin but rigid as possible be used as will be described later. Moreover, preferably, these light-shielding plates 2a, 2b are such that light reflection on the plate surface thereof is as little as possible. Light-shielding plates 2a, 2b having a non-reflective surface by mat-glazing or surface-treating the plate surface thereof in a black or dark color are optimal.

The aforementioned light-shielding grating 2 is mounted and fixed to the front of the display screen 1 that has a multiplicity of light-emitting dots 1a arranged in dot matrix form. At this time, each of the light-shielding plates 2a, 2b of the light-shielding grating 2 is substantially at right angles to or, more correctly, slightly inclined with respect to the display screen 1 as will be described later.

Figure 22:
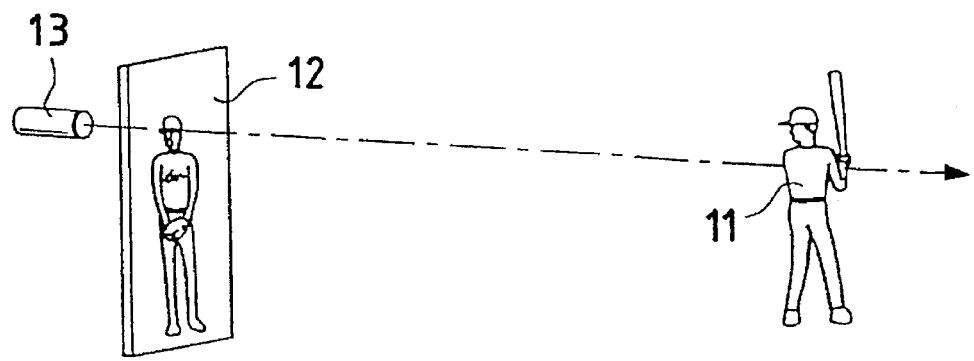
FIG. 22 is a diagram illustrative of an exemplary installation of a conventional display in a batting center.

Thus constructed display with a light-shielding grating is disposed so that the display screen 1 is substantially perpendicular with respect to the ground in a manner similar to the conventional display screen 12 shown in FIG. 22. A batter 11 standing in a batter's box about 15 to 20 m (more correctly, 60 feet, or about 18.3 m) in front of the display screen 1 can see the image of a pitching motion displayed on the display screen 1 through the respective meshes of the light-shielding grating 2. Since external light injecting off to the front is shielded by the respective light-shielding plates 2a, 2b of the light-shielding grating 2, the image on the display screen 1 becomes easy to see with good contrast. Particularly, a display screen 1 having the surfaces of the light-shielding plates 2a, 2b made non-reflective can provide further improved contrast with the external light absorbed by such light-shielding plates 2a, 2b, which therefore can provide a highly visible, clear image even if a low-luminance, inexpensive display screen is used. In addition, these light-shielding plates 2a, 2b substantially prevent the image from being seen in directions other than the front of the display screen 1, which thus liberates the batter from being disturbed by images on displays dedicated to adjacent batter's boxes.

The display screen 1 is designed to display an image of the pitching motion of the pitcher. In order to make the image agreeable to the batter 11, it is practically preferred that the size of the image range from about 70% of the life size to the life size. The size of the screen is therefore preferred to be set as follows. The height A is set to about 1.0 to 2 m; and the width B, to 0.4 to 1 m. The light-emitting dots 1a of the display screen 1 may be pitched at an interval of about 4 to 10 mm to provide a practically sufficient high-definition image since the distance between the batter and the display screen 1, i.e., the distance between the visual point and the display screen 1 is as far as about 15 to 20 m. An LED dot matrix type display screen is the best to construct a display screen with such an image size and dot pitch since not only can such a display screen be freely formed by arranging in matrix form a plurality of LED panels, each LED panel consisting of 16×16 to 24×24 dots, but also the depth of the display screen can be made small. In this case, the appropriate dot arrangement in each mesh of the light-shielding grating 2 ranges from about 4×4 to 24×24 dots, or more preferably, in the order of 8×8 to 16×16 dots.

On the other hand, an interval a at which the horizontally extending light-shielding plates 2a of the light-shielding grating 2 are arranged and an interval b at which the vertically extending light-shielding plates 2b of the light-shielding grating 2 are arranged are preferred to be set to about 40 to 200 mm, respectively, from the viewpoint of rigidity and cost. It may be noted that the intervals a, b of the light-shielding plates 2a, 2b are not necessarily equal to each other, nor are they necessarily equidistant.

Further, the horizontally inward width (depth) of the respective light-shielding plates 2a, 2b is desirably set to be 1.5 times or more as long as the intervals a, b. More specifically, such horizontally inward width W may be set to about 60 to 500 mm. The horizontally inward width W set to be 1.5 times or more as long as the intervals a, b contributes to a remarkable improvement in external light shielding, which in turn further improves visibility. In addition, the thus set horizontally inward width decreases the angle of visual field accordingly, which in turn makes it hard to see an image displayed on the display screen of a display dedicated to an adjacent batter's box. It may similarly be noted that the horizontally inward width W of the light-shielding plates 2a, 2b is not necessarily set to an equal value; as shown in, e.g., FIG. 3, a horizontally inward width W1 of the light-shielding plates 2a interposed between the outermost light-shielding plates 2a may be made smaller than a horizontally inward width W2 of the outermost light-shielding plates 2a so that the former light-shielding plates 2a are mounted so as to be slightly distant from the display screen 1.

That is, the display of the present invention can be used more advantageously by appropriately adjusting the intervals a, b and the horizontally inward width W: for example, the intervals of the light-shielding plates are set to values so that b is larger than a, or the horizontally inward width W of the light-shielding plates 2a is made longer than the horizontally inward width W of the light-shielding plates 2b in the case where the display is located at a site susceptible to direct sunlight from above.

Further, the thickness t of the light-shielding plates 2a, 2b is preferred to be set to such a smallest possible value as not to shield an image displayed on the display screen 1, or at least, to be 1/100 or less, or more preferably, 1/200 or less as thick as the intervals a, b at which the light-shielding plates 2a, 2b are arranged. More specifically, a thickness of about 0.3 to 1.0 mm is appropriate. An iron plate whose thickness t is set to 0.5 mm is used in this embodiment.

The horizontally extending light-shielding plates 2a of the light-shielding grating 2 are actually arranged in the following manner. As shown in FIG. 4, only the light-shielding plate 2a located 1.5 m above the lowermost end is horizontal, i.e., orthogonal to the display screen 1, whereas those located higher than such orthogonally arranged light-shielding plate are slightly inclined downward and those located lower are slightly inclined upward. That is, these light-shielding plates 2a are, as shown in FIG. 4, arranged so as to gradually change the angle of inclination so that the respective light-shielding plates 2a pass a visual point P of the batter 11 when the light-shielding plates 2a are virtually extended frontward under the condition that the visual point P is 20 m in front of the display screen 1 and as high as 1.5 m above the ground. Therefore, the angle $\alpha_1$ of the uppermost light-shielding plate 2a is equal to about 88.6° from $$\tan\alpha_1 = 20 \text{ m}/0.5 \text{ m}$$

so that the uppermost light-shielding plate 2a is about 1.4° inclined downward with respect to horizontality. Further, the angle $\alpha_2$ of the lowermost light-shielding plate 2a is equal to about 85.7° from $$\tan\alpha_2 = 20 \text{ m}/1.5 \text{ m}$$

so that the lowermost light-shielding plate 2a is about 4.3° inclined upward with respect to horizontality.

Similarly, the vertically extending light-shielding plates 2b are arranged so as to be slightly inclined toward the center so as to pass the visual point P when virtually extended frontward.

As a result of the inclination of the horizontally and vertically extending light-shielding plates 2a, 2b, only the thickness t of the light-shielding plates 2a, 2b can be seen from the visual point P of the batter 11, not allowing the plate surface to be seen at all. Therefore, as shown in FIG. 5, the total area S of a single mesh of the light-shielding grating 2 is given as $$S = a \times b$$

and an area SG shielded by the light-shielding plates 2a, 2b out of the total area S is given as $$SG = a \times t + b \times t - t \times t = (a+b-t) \times t$$

Therefore, if it is supposed, e.g., that a=b=100 mm and that t=0.5 mm (t is set to a value 1/200 the intervals a, b), then the total area S is equal to 10000 mm² and SG, about 100 mm² (omitting the subtracting term), thus leaving about 1/100 of the total area S shielded by the light-shielding plates 2a, 2b. That is, 1% of the display screen is shielded. Such shielding ratio does not disturb visibility of the image displayed on the display screen 1 from the visual point of the batter 11, thus allowing the batter 11 to see the image without difficulty. However, if the thickness t of the light-shielding plates 2a, 2b exceeds a value 1/100 of the light-shielding arranging intervals a, b, the area SG shielded by the light-shielding plates 2a, 2b increases, thus making it likely that the batter 11 will have difficulty seeing the image.

The aforementioned calculation is made under the condition that the visual point P of the batter 11 is located at a height of 1.5 m above the ground. However, in reality, the visual point P of the batter 11 is usually shifted in the range of ±300 mm (30 cm) left and right as well as up and down taking into account differences between individuals and displacements of the batter's box. Therefore, if it is supposed that a standard visual point $P_0$ is shifted to a visual point $P_1$ that is 300 mm (30 cm) down as shown in FIG. 6, then a relationship $$\tan \theta = 0.3 \text{ m}/20 \text{ m} = 3 \text{ mm}/200 \text{ mm}$$

is established ($\theta$=0.86°) in the case where the horizontally inward width W of the light-shielding plate 2a is set to 200 mm. Therefore, the batter 11 can see the surface of the light-shielding plate 2a 3 mm wider up and down. In this case, the area SG shielded by the light-shielding plate 2a is given as $$SG = (a+b-t) \times t + (a-t) \times d$$

where d is the width of the plate surface (3 mm) that can be seen as shown in FIG. 7. Therefore, the area SG is about 400 mm² (omitting the subtracting term) with respect to a total area S of 10000 mm², thus leaving about 1/25 the total area S shielded by the light-shielding plates 2a, 2b. That is, the display screen disturbing ratio is equal to 4%.

Further, as shown in FIG. 8, in the case where the horizontally inward width W of the light-shielding plate 2a is set to 300 mm, a relationship $$\tan \theta = 0.3 \text{ m}/20 \text{ m} = 4.5 \text{ mm}/300 \text{ mm}$$

is established ($\theta$=0.86° in this case also), so that the width of the surface of the light-shielding plate 2a seen from the batter 11 is widened 4.5 mm up and down. The area SG shielded by the light-shielding plate 2a in this case is about 550 mm² since d=4.5, thus leaving an area 1/18 or more of the total area S shielded by the light-shielding plates 2a, 2b. That is, the display screen disturbing ratio is equal to 5.5%.

It may be noted that the aforementioned displacements of the visual point hold true for the vertical light-shielding plates 2b with the visual point being moved horizontally.

Therefore, the horizontally inward width W of the light-shielding plates 2a should be set to be 1.5 times or more as long as the light-shielding plate arranging intervals a, b, as described above, up to such a maximum as to limit the display screen disturbing ratio below 10%, or preferably 5% within the visual point shifting range so that the light-shielding effect can be practically sufficient.

As exemplified above, the light-shielding plate arranging intervals a, b, the horizontally inward width W of the light-shielding plates, the angle thereof, and the like may be set so that the installation conditions and environment of the display as well as the visibility of a predetermined seer (conditions such as seeing distance, seeing position, and seeing position displacement) standing vis-a-vis to the display screen become optimal.

While a display with a light-shielding grating which is installed in a baseball batting center and which displays the pitching motion has been described in the aforementioned embodiment, the invention may similarly be applied to displays whose seeing distance and position with respect to where the display screen is installed are limited to a narrow range, such as displays for displaying an image dedicated to an individual player in softball batting centers, tennis practicing centers, and the like.

As is apparent from the foregoing description, according to the display with a light-shielding grating of the first embodiment of the present invention, a highly visible image can be displayed only for a seer having a narrow visible range such as a predetermined batter even if a low-luminance, inexpensive display screen is used to display a pitching motion or the like in a light environment such as in a batting center. As a result, a display screen constructed of a large-sized LED dot matrix light-emitting display body has not only substantially higher luminance than other types of display screens and therefore gives clear images, but also has display contrast significantly improved so that clearer images can be displayed. A display in which the surface of the light-shielding plates of the light-shielding grating is made non-reflective; a display in which the thickness of each light-shielding plate is set to be 1/100 or less as thick as the light-shielding plate arranging intervals; a display in which the horizontally inward width of each light-shielding plate is set to be 1.5 times or more as long as the light-shielding plate arranging intervals; and the like can further remarkably improve visibility.

Second Embodiment

Second embodiment of the invention will now be described in detail with reference to the drawings.

Figure 9:
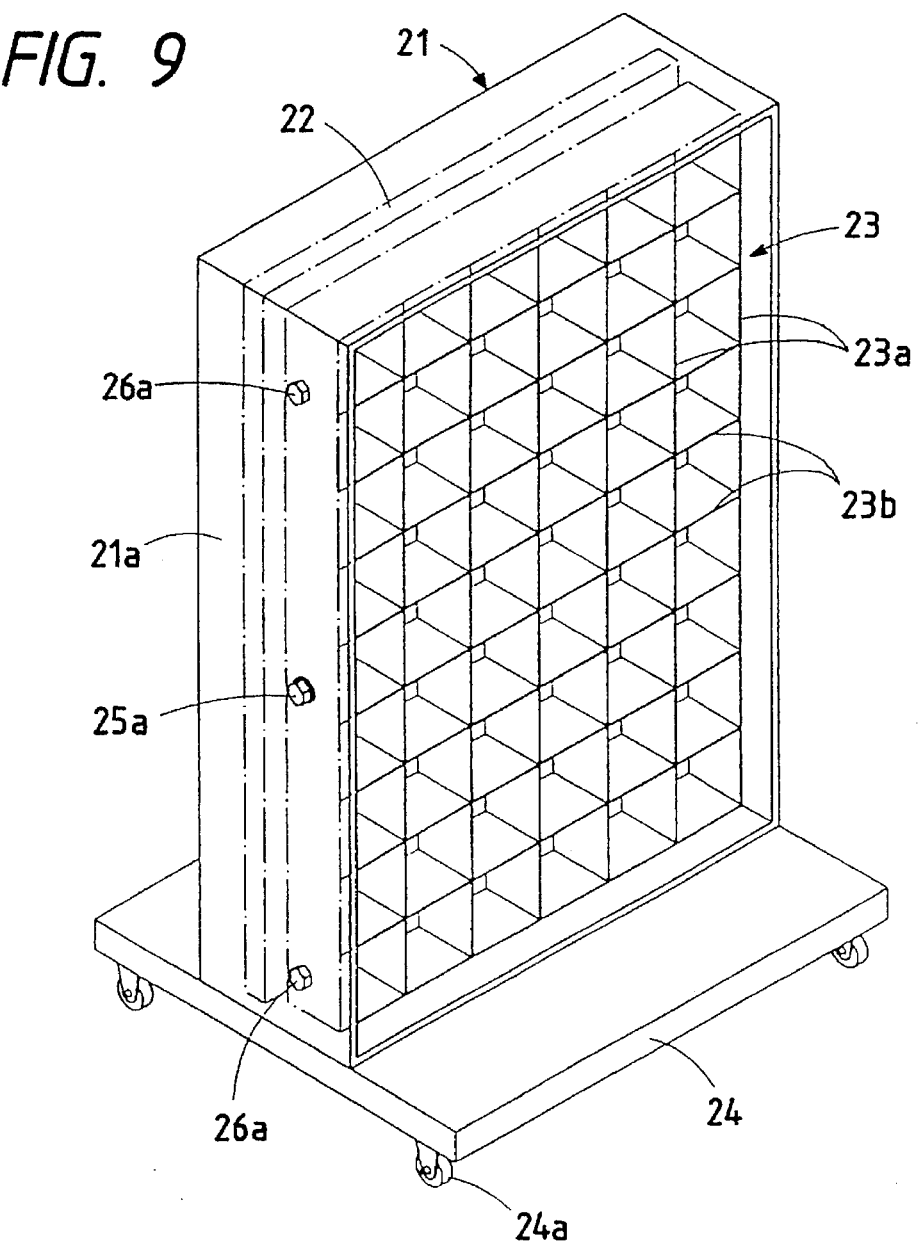
FIG. 9 is a perspective view of a display with a light-shielding grating, which is a second embodiment of the invention.
Figure 10:
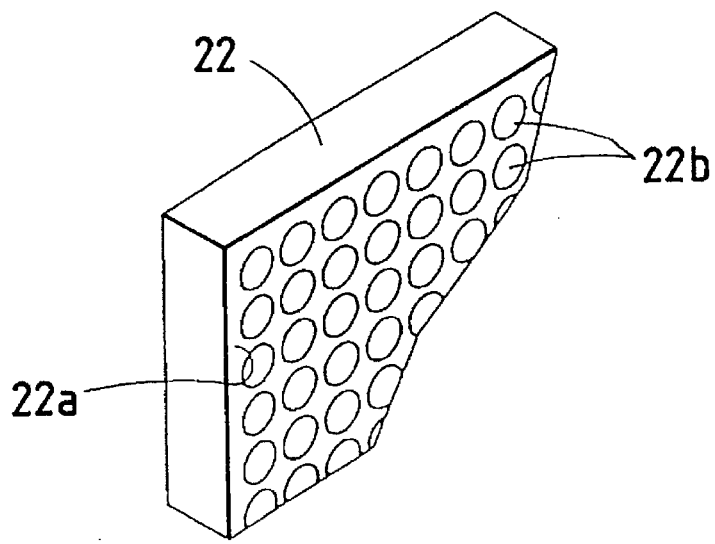
FIG. 10 is a perspective view of a part of a display body of the display of the second embodiment.
Figure 11:
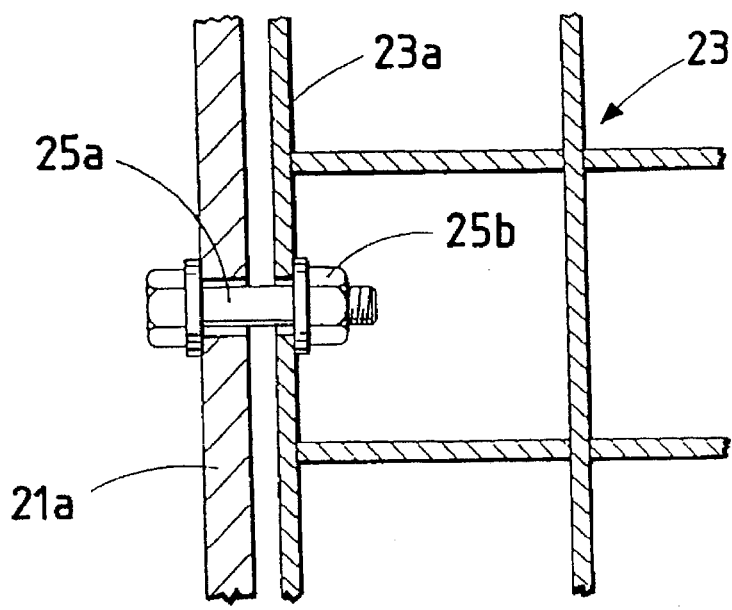
FIG. 11 is a sectional view of a pivotably supporting portion of the light-shielding grating of the display of the second embodiment.
Figure 12:
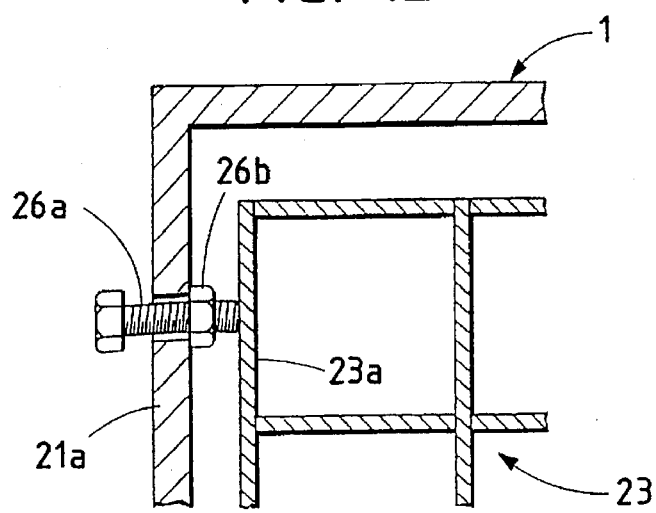
FIG. 12 is a sectional view of a tacked portion of the light-shielding grating of the display of the second embodiment.
Figure 13:
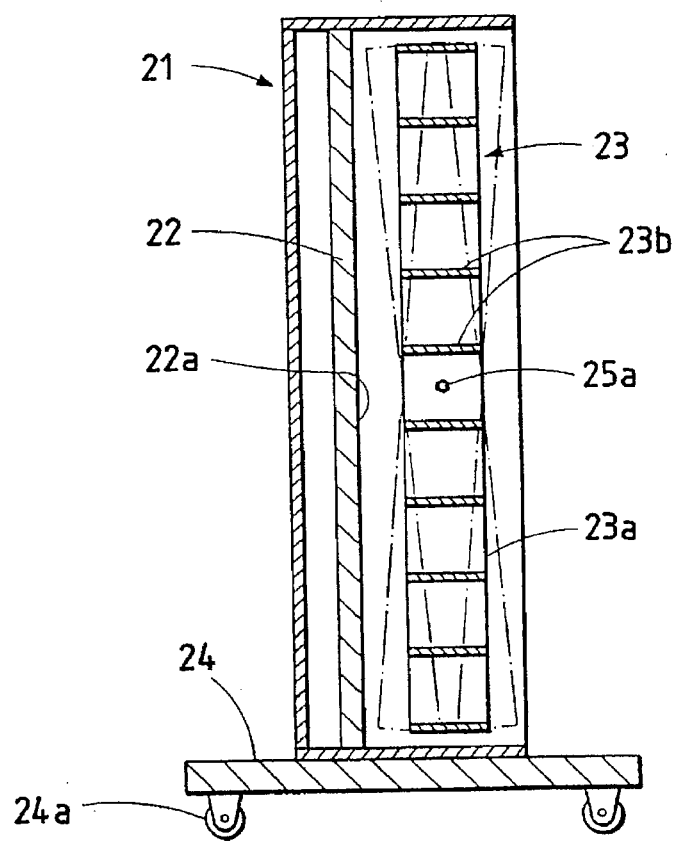
FIG. 13 is a longitudinal sectional view of the display of the second embodiment.
Figure 14:
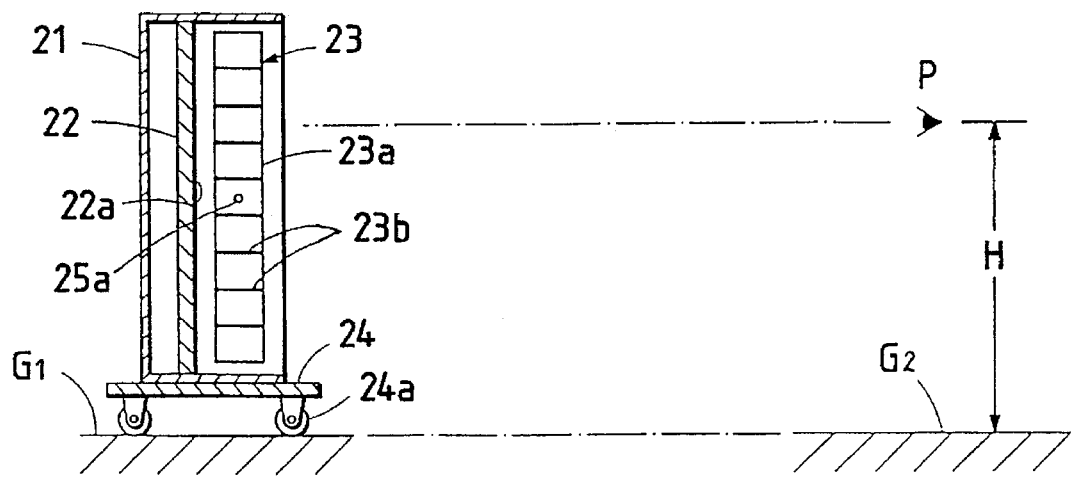
FIG. 14 is a sectional view of the display of the second embodiment having a visual point at a predetermined position.
Figure 15:
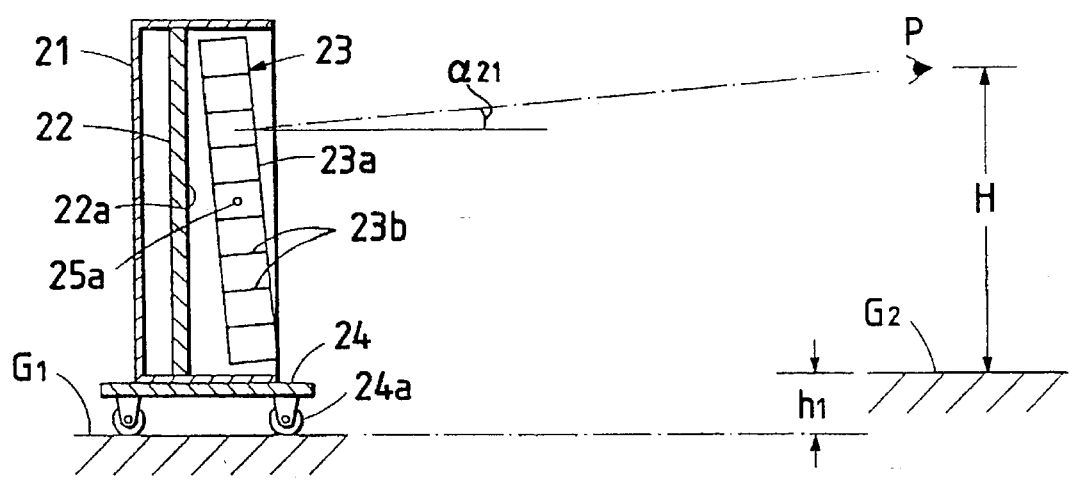
FIG. 15 is a sectional view of the display of the second embodiment with the visual point shifted upward.
Figure 16:
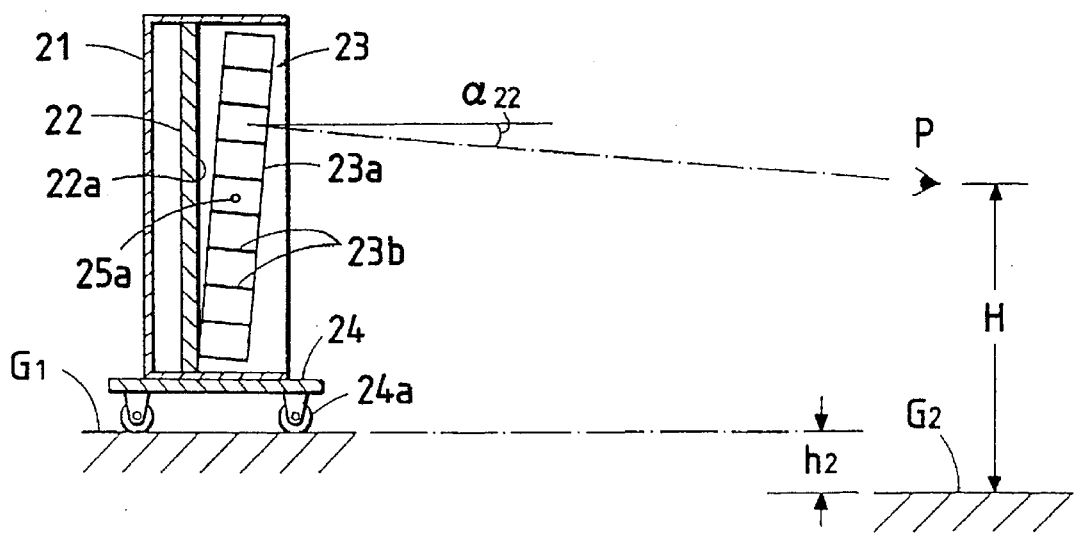
FIG. 16 is a sectional view of the display of the second embodiment with the visual point shifted downward.
Figure 17:
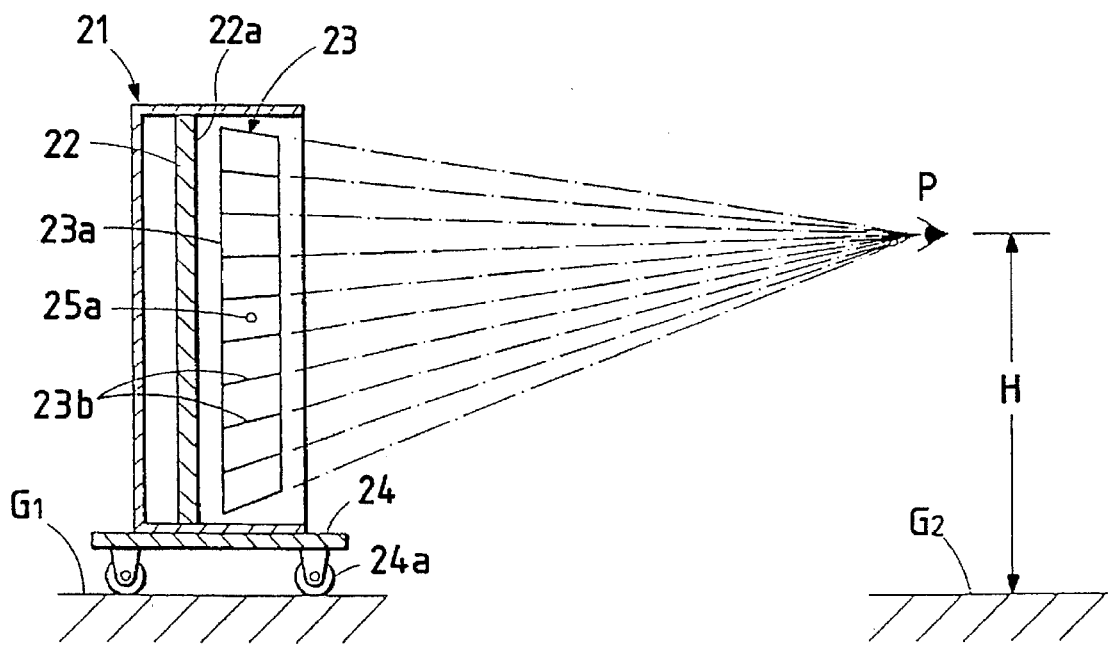
FIG. 17 is a longitudinal sectional view of a display with a light-shielding grating, which is an application of the second embodiment.
Figure 18:
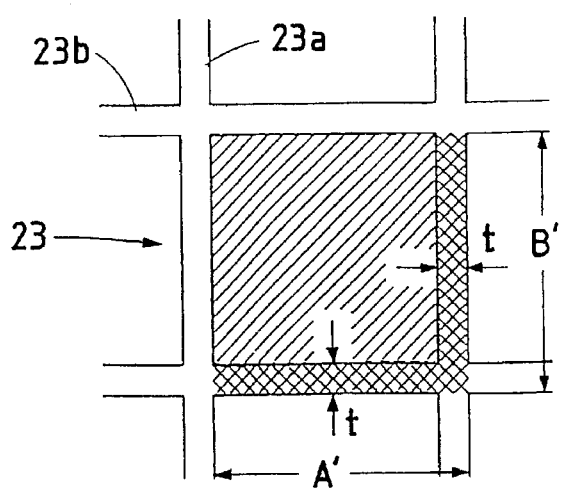
FIG. 18 is partial front view showing a single mesh of the light-shielding grating of the second embodiment.
Figure 19:
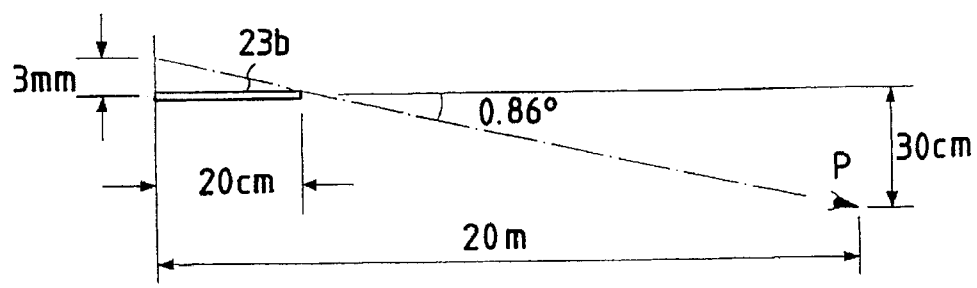
FIG. 19 is a side view illustrative of how shifting of a visual point with respect to a single light-shielding plate affects visibility.
Figure 20:
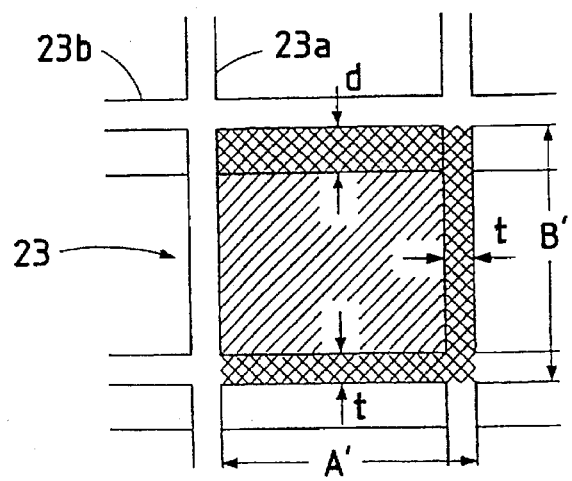
FIG. 20 is a partial front view illustrative of how shifting of a visual point with respect to a single mesh of the light-shielding grating affects visibility.
Figure 21:
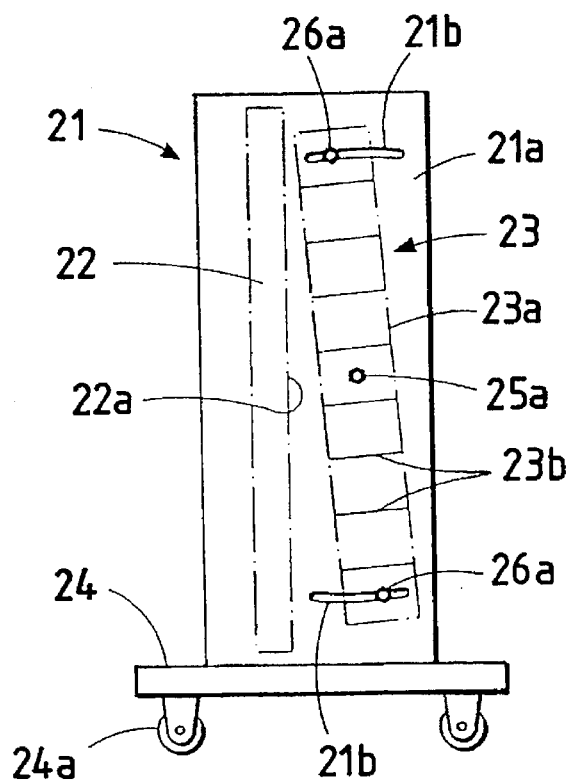
FIG. 21 is a side view of a display with a light-shielding grating, which is still another application of the second embodiment.

FIG. 9 is a perspective view of a display with a light-shielding grating of the second embodiment; FIG. 10 is a perspective view of a part of a display body of the display shown in FIG. 9; FIG. 11 is a sectional view of a pivotably supported portion of the light-shielding grating of the display shown in FIG. 9; FIG. 12 is a sectional view of a tacked portion of the light-shielding grating of the display shown in FIG. 9; FIG. 13 is a longitudinal sectional view of the display shown in FIG. 9; FIG. 14 is a sectional view of the display shown in FIG. 9 having a visual point at a predetermined position; FIG. 15 is a sectional view of the display shown in FIG. 9 with the visual point shifted upward; FIG. 16 is a sectional view of the display shown in FIG. 9 with the visual point shifted downward; FIG. 17 is a longitudinal sectional view of a display with a light-shielding grating, which is an application of the invention; FIG. 18 is a partial front view showing a single mesh of the light-shielding grating; FIG. 19 is a side view illustrative of how shifting of a visual point with respect to a single light-shielding plate affects visibility; FIG. 20 is a partial front view illustrative of how shifting of a visual point with respect to a single mesh of the light-shielding grating affects visibility; and FIG. 21 is a side view of a display with a light-shielding grating, which is another application of the invention.

This embodiment exemplifies a display with a light-shielding grating, installed in a batting center, for displaying a pitching motion by means of light emission.

As shown in FIGS. 9 and 13, in this display with a light-shielding grating, a display body 22 is disposed inside a housing 21 having an opening in the front thereof; a light shielding grating 23 having a multiplicity of light-shielding plates 23a, 23b assembled in a matrix form in vertical and horizontal directions is arranged in front of a display screen 22a of the display body 22; and the light shielding grating 23 is disposed inside the housing 21 so as to be inclined frontward and backward with respect to the display screen 22a within a predetermined angle range. The housing 21 of this display is placed on a movable stand 24 having casters 24a on the four corners thereof, so that only a single person can move and turn the display.

While the housing 21 having a back plate for closing the back thereof is used to prevent ingress of raindrops or the like in this embodiment, it is preferred that heat radiating holes or fins be arranged on the back plate to efficiently radiate heat dissipated from the display body 22. In addition, a housing with no back plate may be used if there is no danger of raindrops entering therefrom.

As shown in FIG. 10, the display body 22 is constructed of an LED dot matrix light-emitting display body arranging a multiplicity of light-emitting dots (pixels) 22b in matrix form on the display screen 22a. Through selective lighting control of each light-emitting dot 22b, the display body 22 can display arbitrary images such as the pitching motion of a pitcher. To display a clear image in a light outdoor environment or the like using such a display body 22, it is usually necessary to increase the number of LEDs within each light-emitting dot 22b or to use high-luminance LEDs so that the light-emitting luminance of each light-emitting dot 22b can be increased. In contrast thereto, this embodiment, instead of using such particularly high-luminance light-emitting dots 22b, utilizes effects of the light shielding grating 23 to provide a sufficiently visible display image.

The display screen 22a of the display body 22 is designed to display an image of the pitching motion of a pitcher. In order to make the image agreeable to a batter, it is practically preferred that the size of the image range from about 70% of the life size to the life size. The size of the screen is therefore preferred to be set as follows. The height is set to about 1 to 2 m; and the width, to 0.4 to 1 m. The light-emitting dots 22b of the display screen 22a may be pitched at an interval of about 4 to 10 mm to provide a practically sufficient high-definition image since the distance between the batter and the display screen 22a, i.e., the distance between the visual point and the display screen 22a is as far as about 15 to 20 m. An LED dot matrix type is the best to construct a display screen with such image size and dot pitch since not only such display screen can be freely formed by arranging in matrix form a plurality of LED panels, each LED panel consisting of 16×16 to 24×24 dots, but also the depth of the display screen can be made small. In this case, the appropriate dot arrangement in each mesh of the light shielding grating 23 ranges from about 4×4 to 24×24 dots, or more preferably, in the order of 8×8 to 16×16 dots.

While the display body 22 based on the aforementioned LED dot matrix system is employed in this embodiment, the invention is not limited thereto. Light-emitting displays such as liquid crystal displays (LCD), plasma display panels (PDP), fluorescent character display tubes may also be used in the invention.

The light shielding grating 23 is assembled by crossing a multiplicity of equidistantly slitted light-shielding plates 23a, 23b at right angles to one another in matrix form while meshing the slits with one another. This construction provides not only an advantage of easy machining and assembling of material, but also an advantage of sufficient rigidity by the arrangement of the material in parallel crosses even if the material is thin. The light-shielding plates 23a, 23b are made of a resin plate, a metal plate, or the like. It is, however, desired that an iron plate or the like that is as thin but rigid as possible be used as will be described later. Moreover, it is preferred that these light-shielding plates 23a, 23b have a non-reflective surface by mat-glazing or by surface-treating the plate surface thereof in a black or dark color. The housing may also be preferred to have both inner and outer surfaces thereof made non-reflective.

While the surface of the display screen 22a and the front of the light shielding grating 23 are protected by transparent plastic plates in practical applications, a light-shielding grating (not shown) may be formed by making the light-shielding plates 23a, 23b in two separate parts, front and back, and interposing the light-shielding plastic plate between the light-shielding plates.

As shown in FIG. 20, an interval A' at which the vertically extending light-shielding plates 23a of the light shielding grating 23 are arranged and an interval B' at which the horizontally extending light-shielding plates 23b of the light shielding grating 23 are arranged are preferred to be set to about 30 to 200 mm, respectively, from the viewpoint of rigidity and cost. Further, the horizontally inward width (depth) of the light-shielding plates 23a, 23b is preferred to be set to be 2.0 times or more as long as the interval A' or B', or more specifically to about 60 to 500 mm. It may be noted that the intervals A', B' of the light-shielding plates 23a, 23b are not necessarily equal to each other, nor are the horizontally inward width thereof necessarily equal to each other. For example, the intervals A', B' and the horizontally inward width may be adjusted so that the light-shielding function can be performed more effectively in such a manner that: the intervals of the light-shielding plates are set to values so that A' is larger than B', or the horizontally inward width of the light-shielding plates 23b is made longer than the horizontally inward width of the light-shielding plates 23a in the case where the display is located at a site susceptible to direct sunlight from above.

Further, the thickness t of the light-shielding plates 23a, 23b is preferred to be set to such a smallest possible value as not to shield an image displayed on the display screen 22a of the display body 22, or at least, to be $\frac{1}{20}$ or less, or more preferably, $\frac{1}{100}$ or less as thick as the light-shielding plate 23a, 23b arranging interval A' or B'. More specifically, a thickness of about 0.3 to 1.2 mm is appropriate. An iron plate whose thickness t is set to 0.5 mm is used in the embodiment.

The thus constructed light shielding grating 23 is disposed in front of the display screen 22a of the display body 22 while interposing a predetermined gap therebetween, and is disposed within the housing by pivotably supporting the vertically extending light-shielding plates 23a on both side ends of the grating to the side plates 21a on both sides of the housing and tacking these light-shielding plates 23a and the side plates 21a at two positions, upper and lower. That is, as shown in FIG. 11, bolt inserting holes are formed in the middle of each side plate 21a of the housing and the light-shielding plate 23a on each side end of the granting, respectively, and a bolt 25a is inserted from the outside of the side plate 21a and is fixed with a nut 25b from the inside of the light-shielding plate 23a, so that the light shielding grating 23 is mounted so as to be rotatable frontward and backward with the bolt 25a as a pivot. On top and bottom of each side plate 21a of the housing are, as shown in FIG. 12, a bolt inserting hole and a nut 26b welded to the inner side of the side plate 21a, so that the light shielding grating 23 is tacked to check the light shielding grating 23 from rotating by inserting a tacking bolt 26a into the nut 26b and causing the tip of the bolt 26a to press the light-shielding plate 23a on each side end of the light shielding grating 23. Therefore, the angle of inclination of the light shielding grating 23 can be adjusted with ease by inclining the light shielding grating 23 frontward or backward to a desired angle while loosening the tacking bolt 26a to pivot the light shielding grating 23 and then tightening the tacking bolt 26a with the light shielding grating 23 thus inclined. As will be described later, the angle of inclination of the light shielding grating 23 may be within the range of ±5° with respect to the display screen 22a of the display body 22. Therefore, the gap between the display screen 22a and the light shielding grating 23 may be adjusted so that the light shielding grating 23 can be inclined within ±5° frontward and backward.

Thus constructed display with a light-shielding grating is installed close to a pitching machine 23 in a batting center. If the ground level G at which the display is installed is substantially as high as a ground level G2 of the batter's box as shown in FIG. 14, the light shielding grating 23 is set so as to be in parallel with the display screen 22a of the display body 22, i.e., so as to be perpendicular with respect to the ground of installation G with the angle of inclination with respect to the display screen 22a being equal to 0°. The batter standing in the batter's box 6 to 20 m (more correctly, 60 feet, or about 18.3 m) ahead of the front of the display practices batting while seeing the pitching motion image displayed on the display screen 22a of the display body 22 through the meshes of the light shielding grating 23. At this time, not only the vertically and horizontally extending light-shielding plates 23a, 23b of the light shielding grating 23 shields external light injected into the display screen 22a off to the front from the left, right, upper and lower sides, but also the housing shields external light injected from the surrounding directions. Therefore, the contrast of the display image is improved, which in turn allows the seer to see the image with ease. Hence, even if a low-luminance, inexpensive display body 22 is used, the image is displayed with good visibility. Moreover, since the image is hard to see in directions other than in the front direction while disturbed by these light-shielding plates 23a, 23b, the batter is in no way disturbed by images displayed by other displays in adjacent batter's boxes.

Particularly, when the surface of the light-shielding plates 23a, 23b and the surface of the housing are made non-reflective, external light is absorbed so that the reflected light is substantially blocked from being injected into the eyes of the seer. When the thickness t of each light-shielding plate 23a or 23b is set to be 1/20 or less as thick as the light-shielding plate arranging interval A' or B', the image displayed on the display screen 22a is shielded only slightly by the thickness of each light-shielding plate 23a or 23b. When the horizontally inward width (depth) of each light-shielding plate 23a or 23b is set to be 2.0 times or more as long as the light-shielding plate arranging interval A' or B', not only the light-shielding characteristic with respect to external light is significantly improved, but also the angle of visibility of the display screen 22a is decreased. Therefore, in these cases, visibility is still further improved, and images displayed on the displays for adjacent batter's boxes are hardly seen.

On the other hand, in some batting centers, there are cases where the ground level G2 of the batter's box is higher than the installation ground level G of the display with a light-shielding grating and vice versa as shown in FIGS. 15 and 16. In these cases, a visual point P of the batter shifts up and down by the differences in height h1, h2, as far as the upper or lower surface of the horizontally extending light-shielding plates 23b is seen with the light shielding grating 23 being in parallel with the display screen 22a as shown in FIG. 14. This means that the display image disturbing ratio is increased as much as h or h2.

In the case where the visual point P is shifted upward as shown in FIG. 15, the angle of the display screen 2a is adjusted by loosening the tacking bolt 26a to pivot the light shielding grating 23, inclining the light shielding grating 23 backward so as to be at right angles to the visual point P, and tightening the tacking bolt 26a under such condition. Further, in the case where the visual point P is shifted downward as shown in FIG. 16, the angle of the light shielding grating 23 is adjusted by reversely rotating the light shielding grating 23 and inclining the light-shielding grating 23 frontward so as to be at right angles to the visual point P. Such adjustment of the light shielding grating 23 causes the visual point P to be positioned right in front of the light shielding grating 23 even if the visual point P is shifted in either direction, up or down, which in turn decreases the display image disturbing ratio by the horizontally extending light-shielding plates 23b and prevents visibility from reducing.

The upward and downward displacements of the visual point caused by differences in height h1, h2 between the display installation ground level G and the batter's box ground level G2 or the like which differences are derived from different conditions of installation and use are practically in the order of 50 to 60 centimeters (less than 1 m). On the other hand, since the horizontal distance between the display and the visual point P of the batter is about 15 to 20 m, angles $\alpha_{21}$, $\alpha_{22}$ by which the visual point P is displaced up and down are 5° at the most. As a result, if the light shielding grating 23 is disposed so that the light shielding grating 23 can be inclined frontward and backward with respect to the display screen 22a of the display body within ±5° as described above, the angle of inclination of the light shielding grating 23 can be reliably adjusted so as to be at right angles to the visual point P without fail.

Since the display of the invention is designed to ensure good visibility only by adjusting the angle of inclination of the light shielding grating 23 with a simple operation even if the visual point P is shifted up and down due to specific installation conditions, such cumbersome operations involved in the conventional example as installing the display so as to be inclined as a whole, and inserting the angle adjusting spacer to the lower end of the display can be totally dispensed with. In addition, the display is secure from falling down since the center of gravity of the display is not one-sided.

If the visual point P is shifted left and right, the display screen 22a of the display body 22 may be set so as to confront such shifted visual point by slightly turning the movable stand 24 horizontally.

By the way, in the light shielding grating 23 according to the second embodiment, all the horizontally extending light-shielding plates 23b are horizontal if the light shielding grating 23 is disposed in parallel with the display screen 22a of the display body 22 as shown in FIG. 14. Therefore, when viewed from a predetermined visual point P in the front, only the thickness is seen with respect to the light-shielding plate 23b that is level with the height H of the visual point P (usually, about 1.5 m). However, since the visual point P is slightly obliquely up or down with respect to the light-shielding plates 23b interposing such light-shielding plate 23b that is level with the height H of the visual point P, the seer can see the surface of these light-shielding plates in addition to their thickness. The area of the surface of each light-shielding plate which can be seen increases with increasing vertical distance between the light-shielding plates, which in turn decreases the visible area in the display screen 22a.

For example, when a light-shielding plate 23b that is 30 cm upward from a visual point P of a batter is seen from the visual point P under the conditions that the visual point P of the batter is 20 m in front of the display and as high as 1.5 m above the ground level G2 and that the horizontally inward width of the light-shielding plate 23a is set to 200 mm as shown in FIG. 19, then a relationship $$\tan\theta = 0.3 \text{ m}/20 \text{ m} = 3 \text{ mm}/200 \text{ mm}$$

is established (where $\theta = 0.86°$). Therefore, the batter can see the lower surface of the light-shielding plate 23a only as much as 3 mm.

Therefore, in this case, the area SG out of the total area $S(S=A'\times B')$ of a single mesh of the light shielding grating 23 which is shielded by the light-shielding plate 23b is given as $$SG=(A'+B'-t)\times t+(B'-t)\times d$$

where d (3 mm) is the width of the plate surface that can be seen as shown in FIG. 20. Therefore, if it is supposed, e.g., that $A'=B'=100$ mm and that $t=0.5$ mm (t is set to $\frac{1}{200}$ as thick as the interval A' and B'), then the area SG is about 400 mm$^2$ (omitting the subtracting term) with respect to a total area S of 10000 mm$^2$, thus leaving about $\frac{1}{25}$ the total area S shielded by the light-shielding plates 23a, 23b. That is, the display screen 22a disturbing ratio is equal to 4%.

The aforementioned similarly applies to the case where all the vertically extending light-shielding plates 23a are at right angles to the display screen 22a. The area of the plate surface which can be seen increases with increasing horizontal distance between the light-shielding plates 23a and the visual point, which in turn increases the display screen disturbing ratio.

To overcome such a problem, the display shown in FIG. 17 is designed in such a manner that the vertically and horizontally extending light-shielding plates 23a, 23b of the light shielding grating 23 are gradually inclined toward a predetermined visual point P so as to pass the predetermined visual point P when the predetermined visual point P is supposed to be 20 m in front of the display and as high as 1.5 m above the ground level G2 as well as when the light-shielding plates 23a, 23b are virtually extended frontward. As a result of this construction, it is only the thickness of the light-shielding plates 23a, 23b that can be seen from the predetermined visual point P, which in turn minimizes the display screen 22a disturbing ratio to thereby allow the seer to find it extremely easy to see the image.

That is, when it is only the thickness t of the light-shielding plates 23a, 23b that can be seen, the area SG shielded by the light-shielding plates 23a, 23b out of the total area $S(S=A'\times B')$ of a single mesh of the light shielding grating 23 is given as $$SG=A'\times t+B'\times t-t\times t=(A'+B'-t)\times t$$

as shown in FIG. 18. Therefore, if it is supposed, e.g., that $A'=B'=100$ mm and that $t=0.5$ mm (t is set to $\frac{1}{200}$ as thick as the interval A' and B'), then the area SG is about 100 mm$^2$ (omitting the subtracting term) with respect to a total area S of 10000 mm$^2$, thus leaving only about $\frac{1}{100}$ the total area S shielded by the light-shielding plates 23a, 23b. That is, it is only 1% of the display screen 22a that is shielded.

It is preferred that the display screen disturbing ratio be set to about 2% or less, although a display screen disturbing ratio of 10% or less imposes no problem in practical terms.

While the aforementioned embodiment, being an example of a pitching motion display installed in a batting center, sets a predetermined visual point P to a distance of 20 m in front of the display and to a height of 1.5 m above the ground level G2, where a predetermined visual point P is set may be determined in consideration of a standard visual point that depends on the use of a display.

Further, while the light shielding grating 23 is tacked so as to push the light shielding grating 23 by the tips of the tacking bolts 26a in the aforementioned embodiment, the tacking device is not limited thereto. FIG. 21 shows an example in which another tacking device is employed. In this display, arcuate slits 21b, 21b are formed at upper and lower portions on both side plates 21a of the housing 21; and bolts 26a, 26a are inserted through these slits into the light-shielding plates on both side ends of the light shielding grating 23 to tack the light-shielding plates from inside. The angle of inclination of such display can also be adjusted by loosening the nuts and inclining the light shielding grating 23 frontward or backward within the range of the length of the slits 21b.

While a display with a light-shielding grating which is installed in a baseball batting center and which displays the pitching motion has been described in the aforementioned embodiment, the invention may similarly be applied to displays for displaying an image dedicated to each individual player in softball batting centers, tennis practicing centers, and the like.

According to the display with a light-shielding grating of the invention, a highly visible image can be displayed only for a seer having a narrow visible range such as a predetermined batter even if a low-luminance, inexpensive display body is used to display a pitching motion or the like in a light environment such as in a batting center. Further, even if the relative positional relationship of the visual point with respect to the display screen is shifted up and down due to installation conditions, satisfactory visibility can be maintained by minimizing the display image disturbing ratio by the light-shielding grating while only inclining the light-shielding grating frontward or backward so that the angle of inclination of the light-shielding grating is adjusted to be right angles to the visual point without having to incline the display as a whole. Therefore, such cumbersome operations involved in the conventional example as installing the display so as to be inclined as a whole, and inserting the angle adjusting spacer to the lower end of the display can be dispensed with. In addition, the display is secure from falling down since the center of gravity of the display is not one-sided.

Particularly, a display designed so that the vertically and horizontally extending light-shielding plates of the light-shielding grating are gradually inclined toward a predetermined visual point so as to pass the predetermined visual point when virtually extended frontward, the display image disturbing ratio by the light-shielding grating is minimized, thus significantly improving visibility. A display whose housing is placed on the movable stand can be moved and turned only by a single person. Further, a display constructed of a large-sized LED dot matrix light-emitting display body has not only substantially higher luminance than other types of displays and therefore gives clear images, but also has display contrast significantly improved so that clearer images can be displayed. Still further, a display in which the surface of the light-shielding plates of the light-shielding grating is made non-reflective; a display in which the thickness of each light-shielding plate is set to be 1/20 or less as thick as the light-shielding plate arranging interval; a display in which the horizontally inward width of each light-shielding plate is set to be 2.0 times or more as long as the light-shielding plate arranging interval; and the like can further remarkably improve visibility.

What is claimed is:

1. A displaying apparatus comprising:

a display screen for displaying images thereon; and a light-shielding grating member including a plurality of light-shielding plates which are assembled in a matrix form in vertical and horizontal directions, so as to define a plurality of vertical light-shielding plates spaced apart at a preset interval and a plurality of horizontal light shielding plates spaced apart at a preset interval, said light-shielding grating member being disposed in a front of said display screen;

wherein selected ones of said light-shielding plates in the vertical and horizontal directions are inclined in directions to pass a predetermined visual point range when said selected ones of said light-shielding plates are virtually extended frontward.

2. A displaying apparatus as claimed in claim 1, wherein said display screen is comprised of an LED dot matrix light-emitting display body which has a height in the range of 1.0 m to 2.0 m and a width in the range of 0.4 m to 1.0 m.

3. A displaying apparatus as claimed in claim 1, wherein a surface of each light-shielding plate of said light-shielding grating member is made non-reflective.

4. A displaying apparatus as claimed in claim 1, wherein a thickness of each light-shielding plate of said light-shielding grating member is set to be less than or equal to 1/100 as thick as the preset interval of at least one of the vertical light-shielding plates and the horizontal light-shielding plates.

5. A displaying apparatus as claimed in claim 4, wherein the thickness of each light-shielding plate is in the range of 0.3 mm to 1.0 mm.

6. A displaying apparatus as claimed in claim 1, wherein a thickness of each light-shielding plate of said light-shielding grating member is set to be less than or equal to 1/200 as thick as the preset interval of at least one of the vertical light-shielding plates and the horizontal light-shielding plates.

7. A displaying apparatus as claimed in claim 1, wherein a horizontally inward width of each light-shielding plate is set to be greater than or equal to 1.5 times as long as the preset interval of at least one of the vertical light-shielding plates and the horizontal light-shielding plates.

8. A displaying apparatus as claimed in claim 7, wherein the horizontally inward width of each light-shielding plate is in the range of 60 to 500 mm.

9. A displaying apparatus as claimed in claim 8, wherein the horizontally inward width of the horizontal light-shielding plates is longer than that of the vertical light-shielding plates.

10. A displaying apparatus as claimed in claim 1, wherein a horizontally inward width of said light-shielding plates interposed between outermost light-shielding plates is made smaller than that of said outermost light-shielding plates.

11. A displaying apparatus as claimed in claim 1, wherein the present intervals of respective light-shielding plates are in the range of 40 mm to 200 mm.

12. A displaying apparatus as claimed in claim 11, wherein the preset interval of the vertical light-shielding plates is longer than that of the horizontal light-shielding plates.

13. A displaying apparatus as claimed in claim 1, wherein said selected ones of said light-shielding plates in the vertical and horizontal directions which are inclined include all of said light-shielding plates except for one horizontal light-shielding plate of said plurality of vertical light-shielding plates which is disposed without any incline with respect to the predetermined visual point range, and one vertical light-shielding plate of said plurality of horizontal shielding plates which is disposed without any incline with respect to the predetermined visual point range.

* * * * *